(12) United States Patent
Schwenk

(10) Patent No.: US 7,238,019 B2
(45) Date of Patent: Jul. 3, 2007

(54) INJECTION MOLDING NOZZLE AND TIP

(75) Inventor: Terry Schwenk, Kenosha, WI (US)

(73) Assignee: Mold-Masters Limited, Georgetown, Ontario (CA)

( * ) Notice: Subject to any disclaimer, the term of this patent is extended or adjusted under 35 U.S.C. 154(b) by 319 days.

(21) Appl. No.: 10/810,679

(22) Filed: Mar. 29, 2004

(65) Prior Publication Data
US 2004/0228943 A1 Nov. 18, 2004

Related U.S. Application Data

(60) Provisional application No. 60/457,586, filed on Mar. 27, 2003.

(51) Int. Cl.
B29C 45/20 (2006.01)
(52) U.S. Cl. .................. 425/549; 264/328.15
(58) Field of Classification Search ........ 425/549; 264/328.15
See application file for complete search history.

(56) References Cited

U.S. PATENT DOCUMENTS

| 4,576,567 | A | * | 3/1986 | Gellert ............... 425/549 |
| 4,711,602 | A | | 12/1987 | Baker |
| 4,965,028 | A | | 10/1990 | Maus et al. |
| 5,028,227 | A | | 7/1991 | Gellert et al. |
| 5,208,052 | A | | 5/1993 | Schmidt et al. |
| 5,282,735 | A | | 2/1994 | Gellert |
| 5,284,436 | A | | 2/1994 | Gellert |
| 5,513,976 | A | | 5/1996 | McGrevy |
| 5,545,028 | A | | 8/1996 | Hume et al. |
| 5,716,651 | A | | 2/1998 | McGrevy |
| 5,885,628 | A | * | 3/1999 | Swenson et al. ............ 425/549 |
| 6,074,195 | A | | 6/2000 | Belous |
| 6,245,278 | B1 | | 6/2001 | Lausenhammer et al. |
| 2002/0071888 | A1 | | 6/2002 | Bouti |
| 2002/0081348 | A1 | | 6/2002 | Bouti |

FOREIGN PATENT DOCUMENTS

WO  WO 01/28750  4/2001

* cited by examiner

Primary Examiner—Tim Heitbrink
(74) Attorney, Agent, or Firm—Medler Ferro PLLC

(57) ABSTRACT

The present invention provides an injection molding nozzle having a nozzle tip. The nozzle tip includes a body portion and a tip portion that extends from a forward end of the body portion. The tip and/or body portions may include at least one planar surface area on an outer surface thereof. The tip and/or body portions may also be provided with a convex and/or concave outer surface area. The geometry of the nozzle tip is such that it maximizes an outer surface area in order to increase the nozzle tip's heat conductance.

19 Claims, 9 Drawing Sheets
(2 of 9 Drawing Sheet(s) Filed in Color)

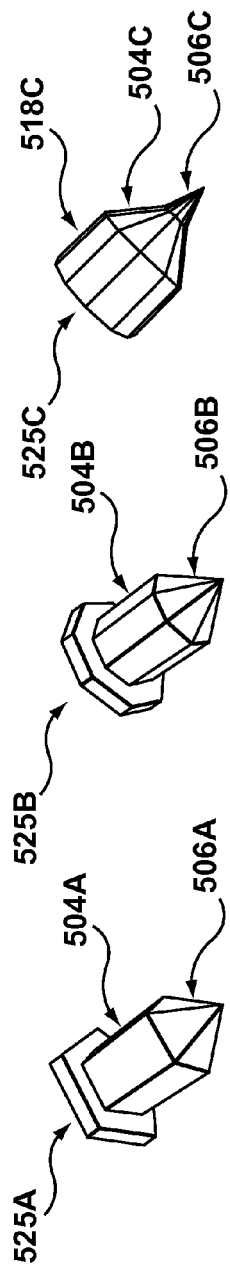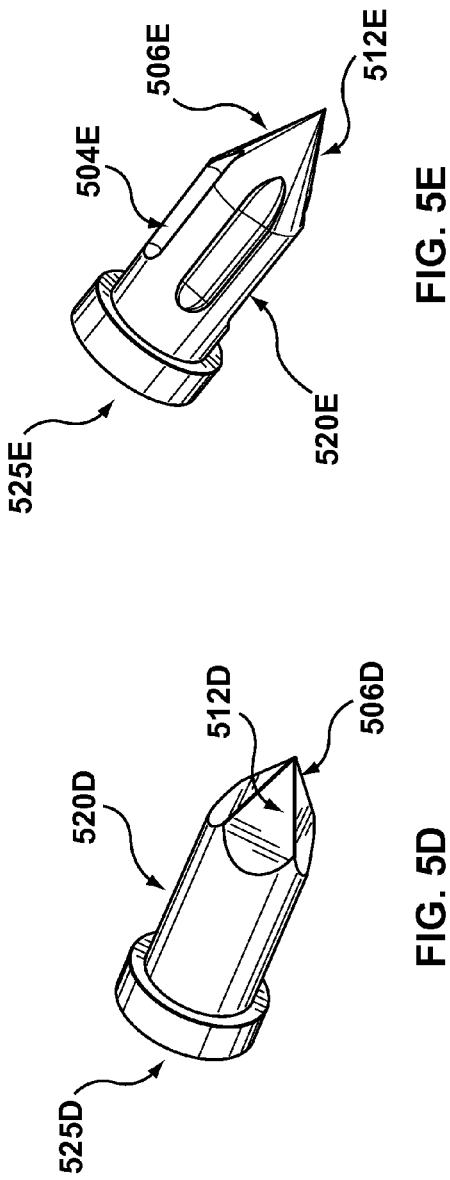

INJECTION MOLDING NOZZLE AND TIP

CROSS-REFERENCE TO RELATED APPLICATIONS

This application claims the benefit under 35 U.S.C. § 119(e) of U.S. provisional application serial No. 60/457,586, filed Mar. 27, 2003, which is hereby incorporated by reference in its entirety.

BACKGROUND OF THE INVENTION

1. Field of the Invention

This invention relates generally to injection molding and more particularly to a nozzle tip seated in the front end of an injection molding nozzle to provide molten plastic to a mold gate.

2. Related Art

Hot runner nozzle tips may include single or multiple outlet channels for feeding molten resin to a mold cavity in an injection molding system. The hot runner nozzle tips are generally spaced from an injection gate leading to the mold cavity. The spacing is necessary to avoid direct contact between the cooled mold cavity by the heated nozzle tip in order to prevent the nozzle tip from rapidly cooling. Rapid cooling of the nozzle would cause the resin to freeze up and render the nozzle inoperable. In addition, if the nozzle tip is heated from a cold condition to its operating temperature, generally 350°-450° F. space must be provided for thermal expansion, which results in the nozzle and the nozzle tip growing in length.

Conventional hot tip designs usually provide a bubble or resin space surrounding the tip that fills with resin. This resin layer is considered beneficial in that the resin in the bubble has poor thermal conductivity compared to steel and effectively insulates the hot tip from the cooled mold cavity. The amount of resin resulting in the resin layer depends on various factors such as the temperature of the tip, the temperature of the cavity, and the type of plastic resins being processed. However, the presence of resin within the bubble around the nozzle tip results in high pressure drops between the tip area and the mold cavity.

Further, the bubble can result in "hang up" areas around the nozzle tip where resin stays that can narrow the flow path of the melt around the nozzle tip and that can make color or material changing of the resin problematic. Due to these undesirable results, it often becomes necessary to purge the nozzle tip of such resin between drops and/or between material or color changes which can be time consuming and wasteful of the resin. One way in which this is done is to dismantle and clean the nozzle assembly to remove all traces of the previous resin. This can be very time consuming and expensive due to lost production time.

In order to keep melt flowing through a nozzle tip and to effectuate satisfactory color change, one attempted solution is to provide a nozzle tip with an element that induces a spiral flow pattern. Another attempted solution to keep melt flowing through a nozzle tip and to effectuate satisfactory color change is to provide nozzle tips with mixing elements to improve the homogeneity of the resin flowing through the nozzle tips. However, these solutions are not entirely effective in overcoming the foregoing problem and/or promoting rapid color changing.

It is therefore desirable to provide a simple and effective nozzle tip design that does not reduce but improves the melt flow path around a nozzle tip. A nozzle tip according to the present invention achieves this result by incorporating a nozzle tip geometry that increases the surface area of the tip portion to allow for greater heat transfer to the plastic resin in the tip area of the hot runner nozzle. Such a nozzle tip also improves the heat profile, reduces pressure drops, and enhances material flushing at the nozzle tip.

SUMMARY OF THE INVENTION

In an embodiment, the present invention provides an injection molding nozzle having a nozzle tip. The nozzle tip includes a body portion having a rear end and a forward end. The nozzle tip is further provided with a tip portion that extends from the forward end of the body portion. In order to improve heat conductance in the nozzle tip, various nozzle tip geometries are contemplated that provide increased surface area. For example, in an embodiment, the body and/or tip portions of the nozzle tip include at least one planar surface. Still further, the outer surface of the body and/or tip portions can include concave and/or convex surfaces.

BRIEF DESCRIPTION OF THE FIGURES

The patent or application file contains at least one drawing executed in color. Copies of this patent or patent application publication with color drawing(s) will be provided by the Office upon request and payment of the necessary fee.

The accompanying drawings illustrate the present invention and together with the description, further serve to explain the principles of the invention and to enable a person skilled in the relevant art to make and use the invention. In the drawings, like reference numbers indicate identical or functionally similar elements. Additionally, the left-most digit(s) of a reference number identifies the drawing in which the reference number first appears.

FIGS. 5A-5E illustrate various embodiments of nozzle tips according to the present invention.

DETAILED DESCRIPTION OF THE INVENTION

Figure 1:
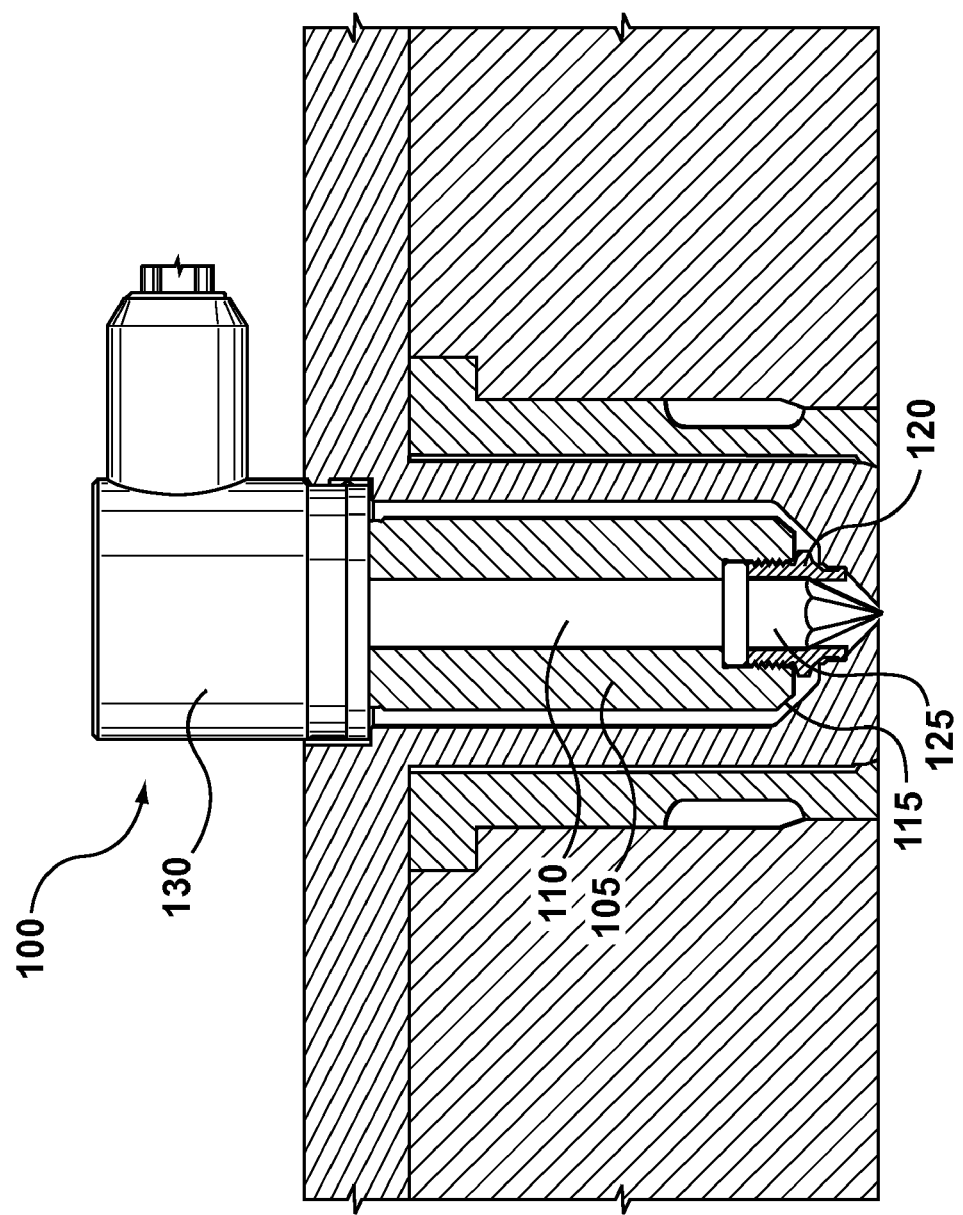
FIG. 1 illustrates a partial cross-sectional view of an injection molding apparatus according to an embodiment of the present invention.
Figure 2:
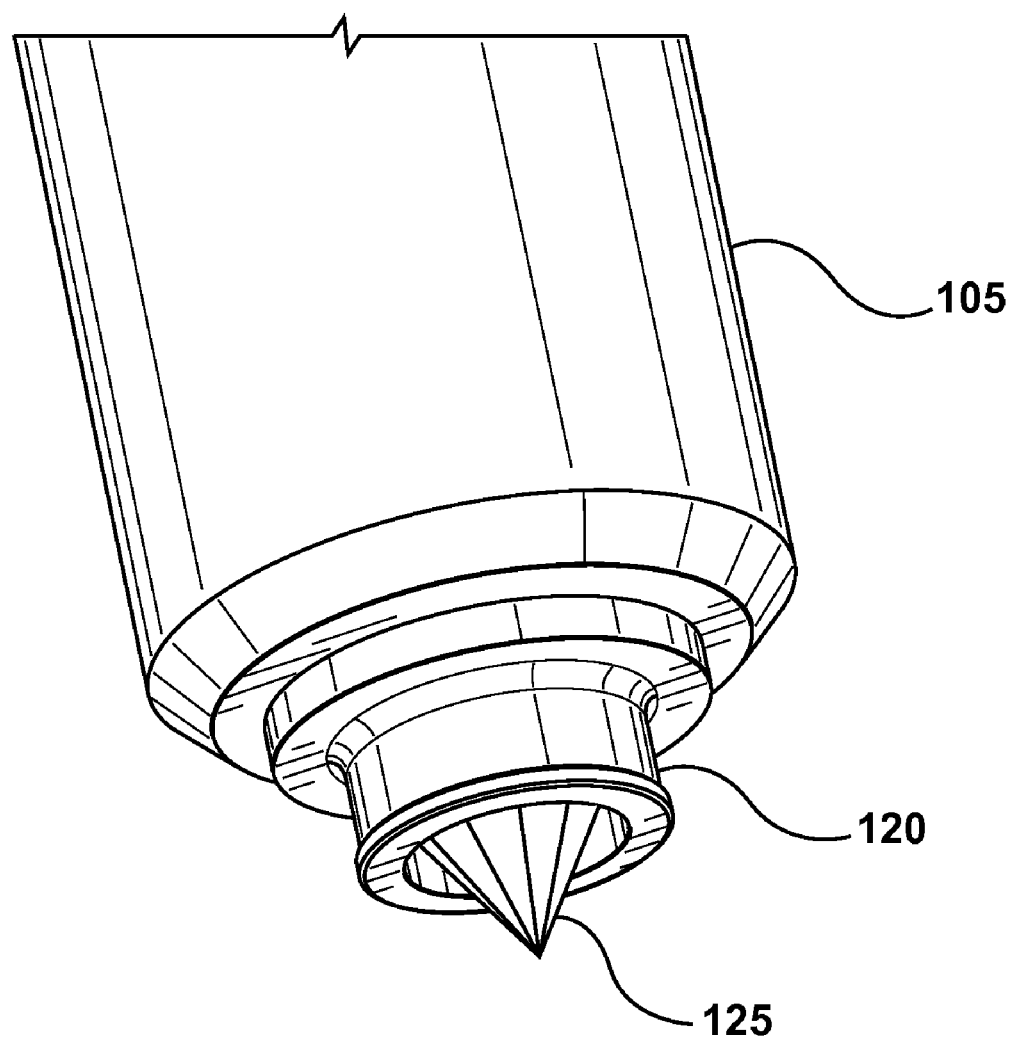
FIG. 2 illustrates a perspective view of a portion of the injection molding nozzle shown in FIG. 1.
Figure 3:
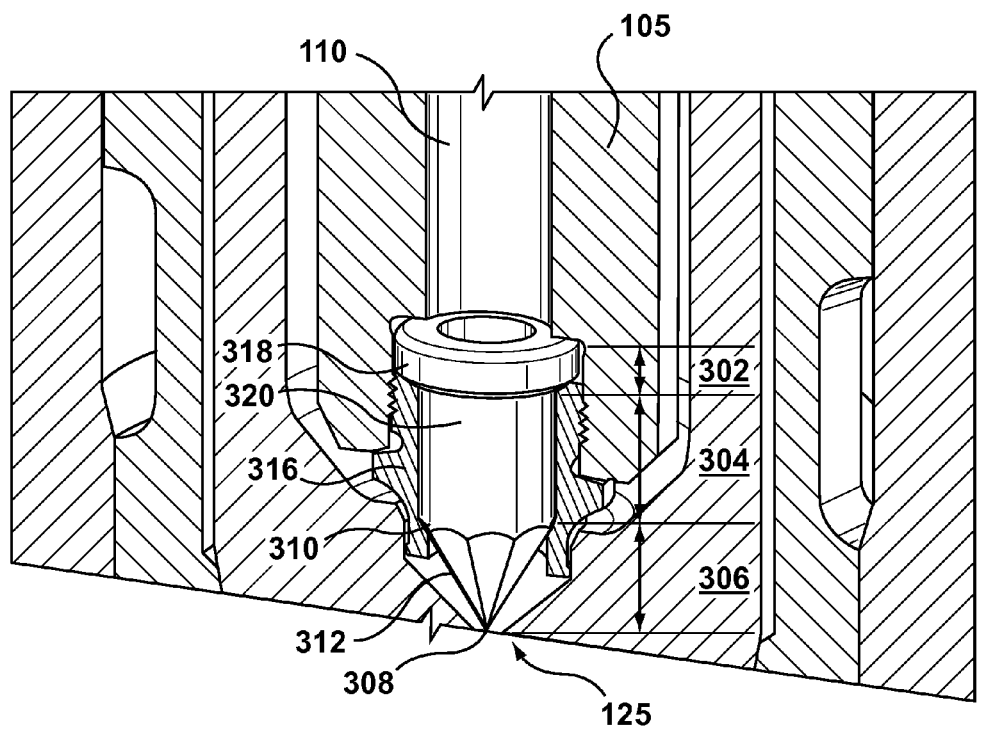
FIG. 3 illustrates a cut-away perspective view of a portion of the injection molding apparatus of FIG. 1.

Referring to FIGS. 1-3, an injection molding nozzle 100 is shown in accordance with an embodiment of the present invention. The nozzle is comprised of a nozzle body 105 having a melt channel 110. The nozzle body includes a nozzle head 130 that abuts a melt distribution manifold (not shown). Nozzle body 105 is further provided with a front end 115.

In an embodiment of the present invention, nozzle body front end 115 includes a threaded seat for receiving a nozzle seal 120. A nozzle tip 125 is held in place by nozzle seal 120. Nozzle tip 125 is formed of a highly thermally conductive material, such as steel or Beryllium Copper. FIG. 2 provides a perspective view of injection molding nozzle 100 showing nozzle body 105, nozzle seal 120, and nozzle tip 125.

Figures 3A, 3B:
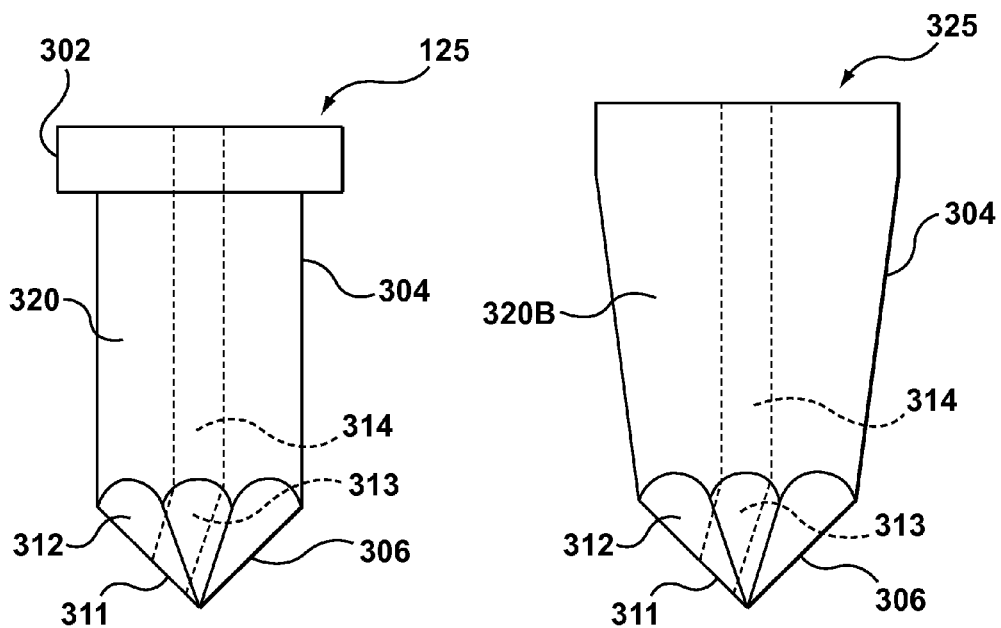
FIG. 3A illustrates a nozzle tip as shown in FIG. 3 according to an embodiment of the present invention.
FIG. 3B illustrates a nozzle tip according to another embodiment of the present invention.

As shown in FIGS. 3A and 3B, a nozzle tip melt bore 314 extends through at least a portion of nozzle tips 125, 325. Melt bore 314 is centrally located along a longitudinal axis of nozzle tips 125, 325 and is alignable with nozzle melt channel 110 of nozzle body 105 to provide a passage for a melt therethrough. In this embodiment, nozzle tips 125, 325 are diverted tips, however various other tips may be used, such as torpedo-type tips, without departing from the scope of the present invention. In a further embodiment of the present invention, as shown in nozzle tips 125, 325, and 425 of FIGS. 3A, 3B, and 4 respectively, centrally located melt bores 314, 414 are in fluid communication with diverted melt bores 313, 413. Diverted melt bores 313, 413 extend from an end of centrally located melt bores 314, 414 to outlets 311, 411 defined at an end of nozzle tips 125, 325, and 425, thereby providing a passage for a melt therethrough.

Figure 4:
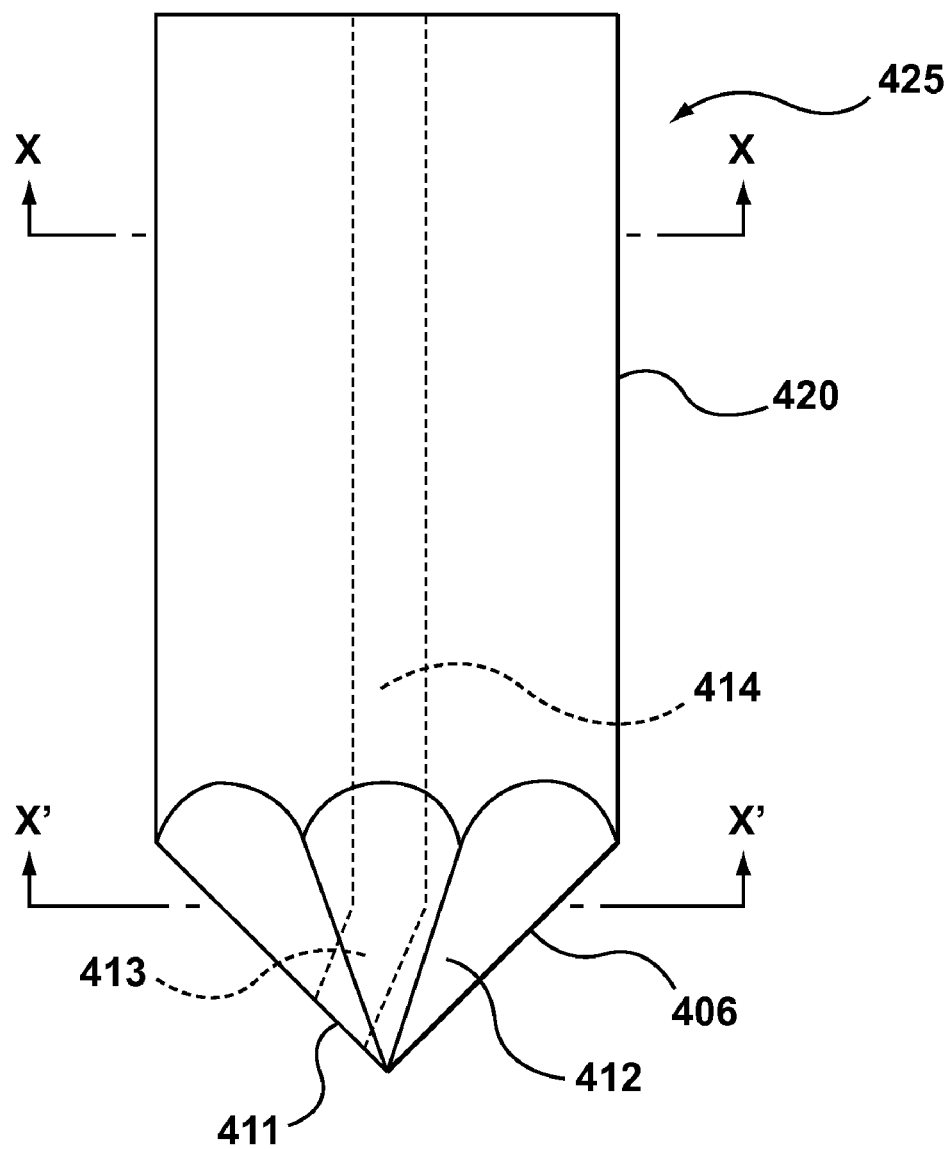
FIGS. 4 illustrates a nozzle tip according to another embodiment of the present invention.
Figure 4A:
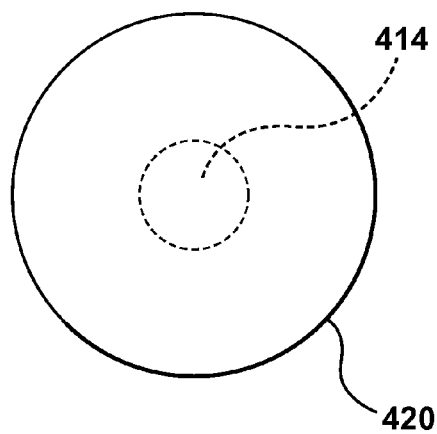
FIG. 4A is a cross-section of the nozzle tip of FIG. 4 along line X-X thereof.
Figure 4B:
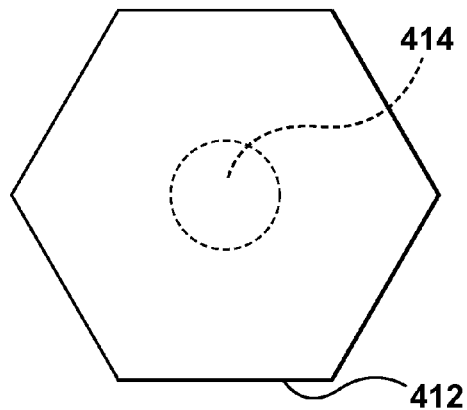
FIGS. 4B-4D are cross-sections of various embodiments of a nozzle tip of FIG. 4 along line X'-X' thereof.
Figure 4C:
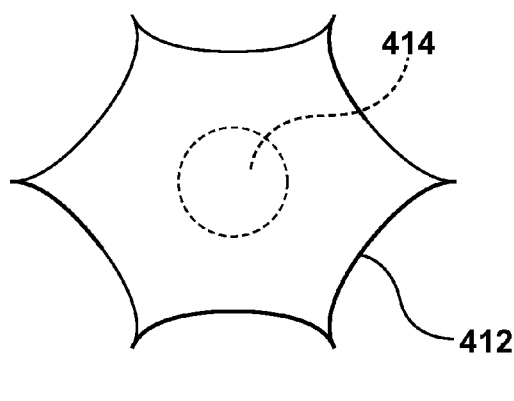
Figure 4D:
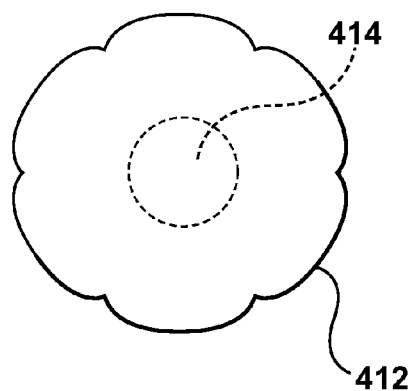

As shown in an embodiment of the present invention in FIG. 3, nozzle tip 125 is comprised of a body portion 304 with an outer surface area 320 and a tip portion 306 with an outer surface area 312. As further shown in FIGS. 3, 3A, a collar portion 302 extends outwardly near a rearward end 318 of body portion 304. However, FIGS. 3B and 4 illustrate further embodiments of a nozzle tips 325 and 425 according to the present invention without a collar portion.

In the embodiment of FIGS. 3 and 3A, body portion 304 includes a cylindrical outer surface 320 extending from rearward end 318 to a forward end 316 of body portion 304. In the embodiment of FIG. 3B, nozzle tip 325 has a nozzle tip body portion 304 that includes a conical outer surface 320B having more surface area than the body portion of the embodiment of FIG. 3A. In further embodiments of the present invention, such as those shown in FIGS. 5A-5C, the outer surface of the body portion of the nozzle tip may include at least one planar surface to increase the surface area thereby increasing the area of conductance. A planar surface includes a surface involving only two dimensions, a coplanar surface, a flat surface, or any other planar surface. In another embodiment, the outer surface of the body portion of the nozzle tip may include a concave and/or convex portion to increase the surface area thereby increasing the area of conductance. In each embodiment so described, the overall surface area of nozzle tips 125, 325, and 425 are preferably increased over a similarly sized nozzle tip cylindrical body portion thereby improving its heat conductance.

In the embodiment of FIGS. 3, 3A and 3B, tip portion 306 of nozzle tips 125, 325 is tapered from a rear end 310 to a tip end 308 thereof. Outer surface area 312 of tip portion 306 is to be maximized in order to increase its area of conductance. Thus in the embodiments of the present invention as shown in FIGS. 3, 3A and 3B, outer surface area 312 of tip portion 306 is comprised of a plurality of planar surfaces. At least a portion of outer surface area 312 is located above diverted melt bore 313 and outlet 311. In various embodiments of the present invention as shown with reference to FIGS. 4 and 4B-4D, nozzle tip 425 has an outer surface area 412 of tip portion 406 that may be comprised of a plurality of concave and/or convex surfaces. In each embodiment so described, the overall surface area of nozzle tip 425 is preferably increased to maximize the area of heat conductance at the tip portion over a similarly sized nozzle tip conical tip portion thereby improving its heat conductance.

FIGS. 5A-5E illustrate exemplary nozzle tips according to various embodiments of the present invention.

Referring to FIG. 5A, a nozzle tip 525A is shown with a plurality of planar surfaces in its body portion 504A forming substantially a pentagon in perimeter. In addition, a tip portion 506A is comprised of a plurality of planar surface areas forming substantially a pentagon in perimeter. Referring to FIG. 5B, a nozzle tip 525B is also comprised of a plurality of planar surfaces in its body portion 504B and tip portion 506B forming an octagon in perimeter. While five and eight planar surface areas are disclosed herein, any number of planar surfaces suitable for an injection molding application are considered within the purview of the present invention. When the body portion and/or tip portion have a number of planar surfaces comprising its perimeter, the body portion and/or tip portion will have a polygonal cross section.

In FIG. 5C a nozzle tip 525C is provided with a rear body portion 518C, a central body portion 504C, and a forward tip portion 506C. In this embodiment, each portion is provided with an outer surface area that is optimized for heat conductance to a melt during the injection molding process.

FIG. 5D illustrates a nozzle tip 525D having a cylindrical body portion outer surface 520D and a plurality of outer surface areas 512D in a tip portion 506D. In the illustrated embodiment, the plurality of outer surface areas 512D in tip portion 506D are planar surfaces.

Referring to FIG. 5E, a nozzle tip 525E is shown having a body portion 504E with an outer surface area 520E that has a contour that is partially convex. Further, the convex contour is continued into an outer surface area 512E of a tip portion 506E.

Figure 6:
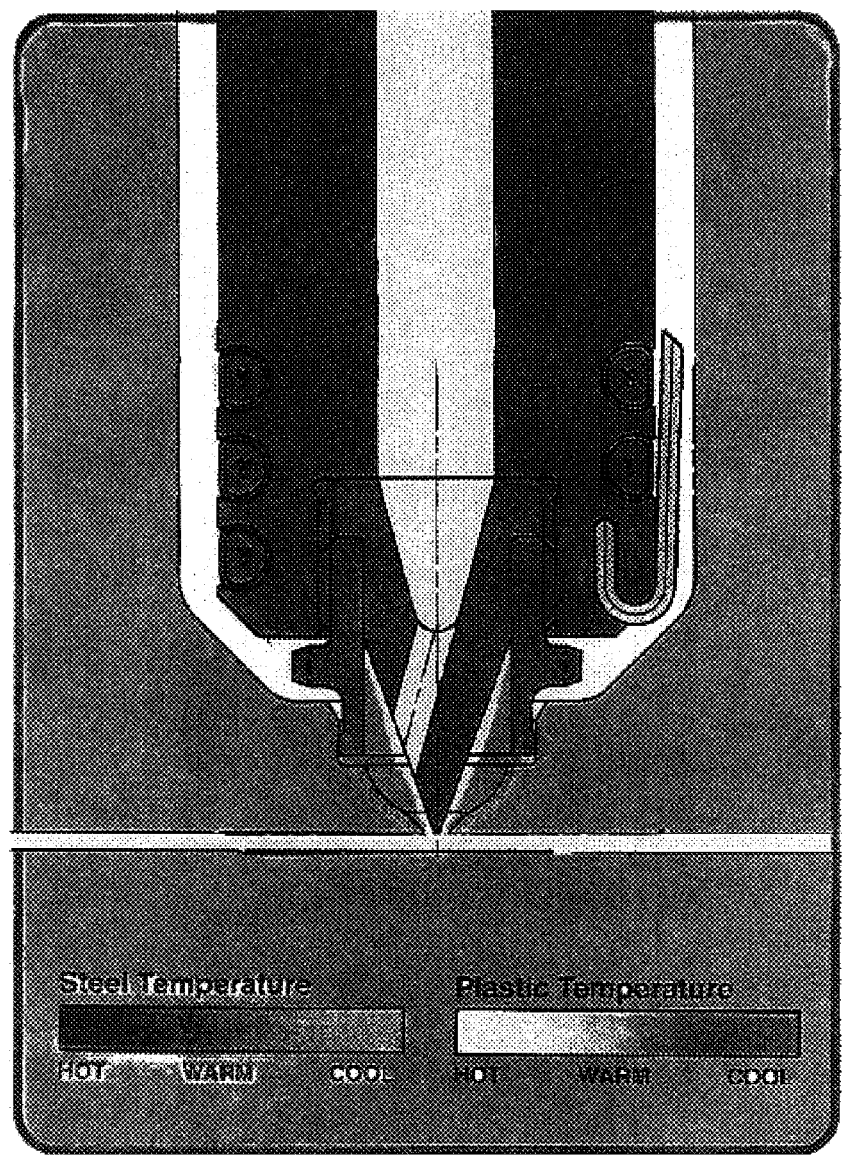
FIG. 6 illustrates a heat profile in a prior art injection molding nozzle tip.

FIG. 6 illustrates a heat profile for a prior art injection molding nozzle tip wherein the nozzle tip is conically shaped. As shown by the color variance, although the nozzle tip is hot, this heat is effectively conducted to only a slight portion of the plastic resin within the bubble around the nozzle tip.

Figure 7:
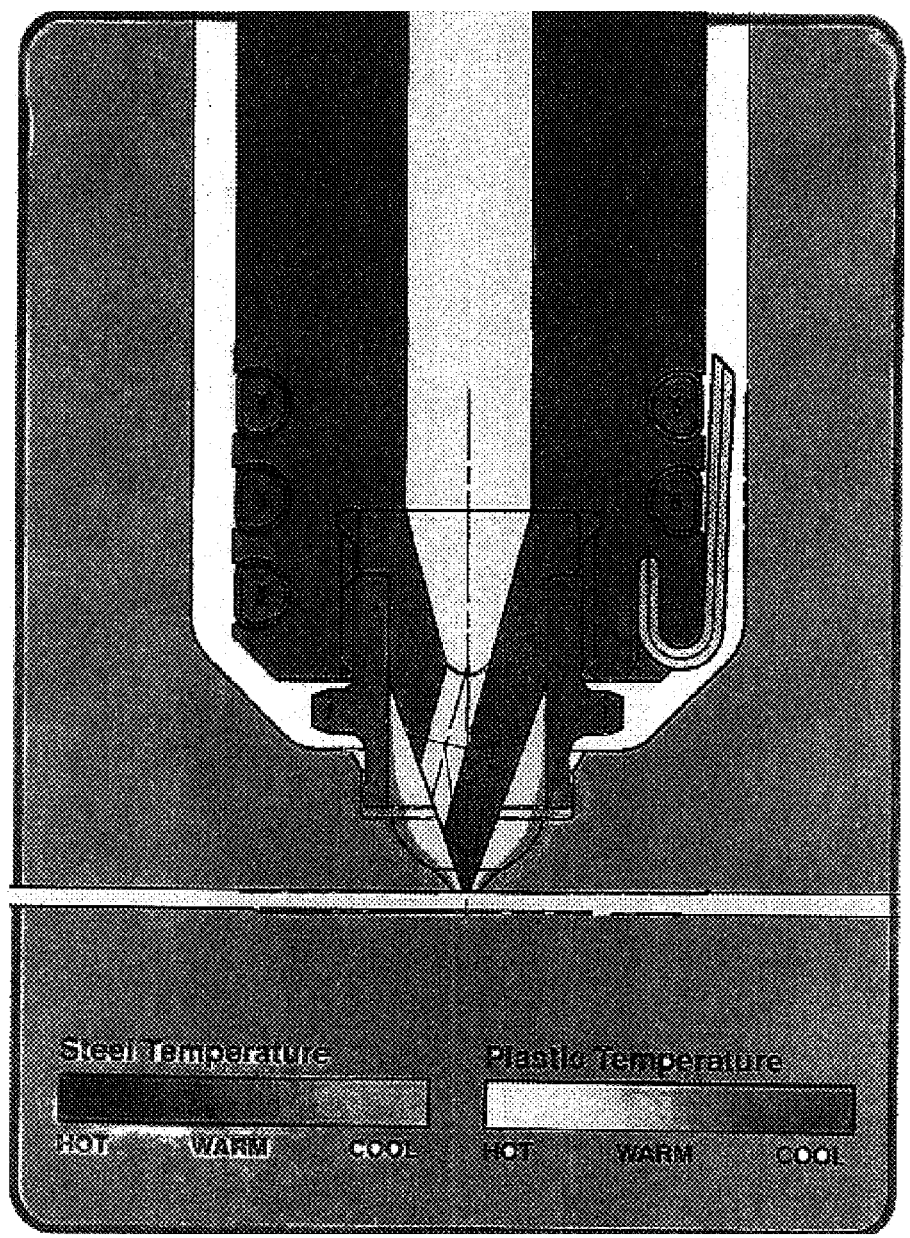
FIG. 7 illustrates a heat profile of an injection molding nozzle tip according to an embodiment of the present invention.

In comparison, FIG. 7 illustrates a nozzle tip configured in accordance with an embodiment of the present invention wherein the nozzle tip includes a plurality of planar surfaces in its tip portion to increase its area of conductance. As a result of the increased surface area provided by the planar outer surfaces on the tip portion more heat is transferred to the plastic resin within the bubble around the nozzle tip. Use of a nozzle tip according to the present invention creates a better heat profile in the tip area thereby improving melt flow into a mold cavity and reducing melt "hang-up" in the bubble area of the nozzle tip.

Further, use of a nozzle tip according to the present invention also reduces the pressure drop associated with a conical nozzle tip. By providing a nozzle tip with a larger surface area, more of the resin in the bubble area of the nozzle tip remains in a molten state because heat is transferred to the resin over a larger surface area of the tip. In addition, the improved heat profile in the tip area of the present invention results in an increased flow of resin into a mold cavity, and a decreased flow of resin into the bubble area of the nozzle tip. Decreasing the amount of stagnant resin in the bubble area of the nozzle tip results in reduced pressure drops. Reduced pressure drops allow for a wider processing window and improved control over the molding process. Improved control over the molding process reduces manufacturing times, increases productivity, and improves product quality.

Figure 8:
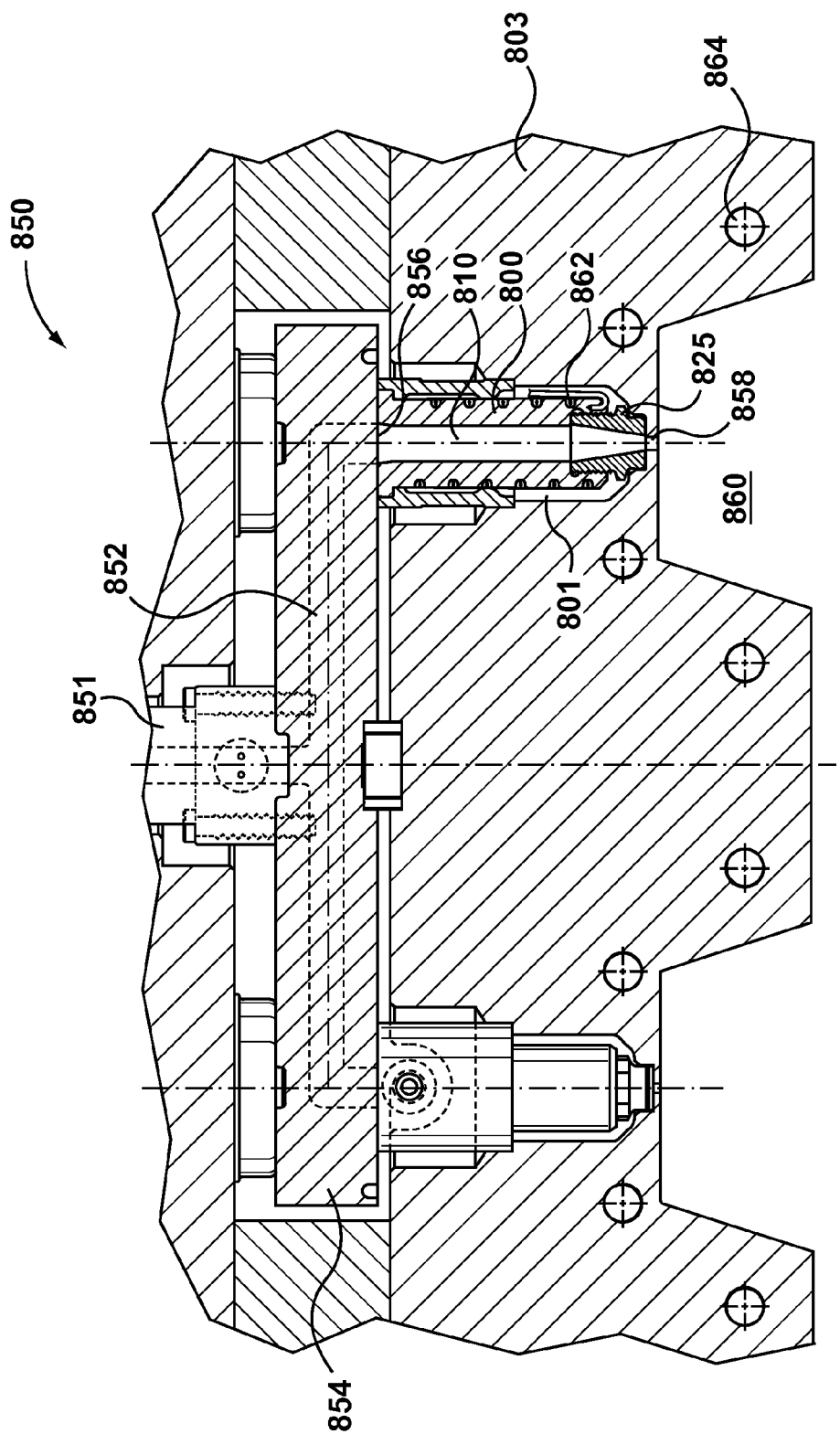
FIG. 8 illustrates a partial cross-sectional view of an injection molding apparatus according to an embodiment of the present invention.

Referring to FIG. 8, a portion of a conventional injection molding system 850 is shown. A manifold melt channel 852 extends through a hot runner manifold 854 and is in fluid communication with a melt source from a machine nozzle (not shown) via sprue bushing 851. A nozzle 800 is positioned within a nozzle cutout 801 of a cavity plate 803. A nozzle melt channel 810 of nozzle 800 is in fluid communication with manifold melt channel 852 for receiving a melt therefrom. Particularly, the melt passes from manifold melt channel 852 through a manifold outlet 856 into nozzle melt channel 810. Nozzle melt channel 810 carries the melt towards a mold gate 858 that leads to a mold cavity 860. Injection molding apparatus 850 may include heater(s) 862 and cooling channel(s) 864. Conventional nozzle tip 825 of injection molding system 850 may be replaced with a nozzle tip according to any of the embodiments of the present invention previously described.

Various embodiments of the present invention have been described above. It should be understood that these embodiments have been presented by way of example only, and not limitation. It will be understood by those skilled in the relevant arts that various changes in form and details of the embodiments described above can be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. An injection molding nozzle comprising:
   a nozzle tip, said nozzle tip having
      a cylindrical body portion,
      a tapered tip portion extending from an end of said body portion, wherein said tip portion includes a planar outer surface area along a length thereof, and
      a centrally located melt bore extending through said body portion and at least a portion of said tip portion and having a melt bore outlet, wherein said planar outer surface area of said tip portion is at least partially located above said melt bore outlet.

2. The injection molding nozzle of claim 1, wherein said tapered tip portion further includes a plurality of planar surface areas.

3. The injection molding nozzle of claim 1, further comprising a diverted melt bore extending from an end of said centrally located melt bore.

4. The injection molding nozzle of claim 3, wherein at least a portion of said at least one planar surface area is located above said diverted melt bore.

5. An injection molding nozzle comprising:
   a nozzle tip, said nozzle tip having
      a body portion,
      a tip portion extending from an end of said body portion, wherein said tip portion includes a concave outer surface area, and
      a centrally located melt bore extending through said body and at least a portion of said tip portion and having a melt bore outlet, wherein said concave outer surface area of said tip portion is at least partially located above said melt bore outlet.

6. The injection molding nozzle of claim 5, wherein said body portion includes at least one concave outer surface area.

7. The injection molding nozzle of claim 5, wherein said body portion includes a plurality of concave outer surface areas.

8. The injection molding nozzle of claim 5, wherein said tip portion further includes a plurality of concave outer surface areas.

9. The injection molding nozzle of claim 5, further comprising a diverted melt bore extending from an end of said centrally located melt bore.

10. The injection molding nozzle of claim 9, wherein at least a portion of said at least one concave outer surface area is located above said diverted melt bore.

11. An injection molding nozzle comprising:
    a nozzle tip, said nozzle tip having
       a body portion,
       a tip portion extending from an end of said body portion, wherein said tip portion includes a convex outer surface area, and
       a centrally located melt bore extending through at least a portion of said body and tip portions.

12. The injection molding nozzle of claim 11, wherein said body portion includes at least one convex outer surface area.

13. The injection molding nozzle of claim 11, wherein said body potion includes a plurality of convex outer surface area.

14. The injection molding nozzle of claim 11, wherein said tip portion further includes a plurality of convex outer surface areas.

15. The injection molding nozzle of claim 11, further comprising a diverted meld bore extending from an end of said centrally located meld bore.

16. The injection molding nozzle of claim 15, wherein at least a portion of said at least one convex outer surface area is located above said diverted melt bore.

17. An injection molding nozzle comprising:
    a nozzle tip, said nozzle tip having
       a body portion,
       a tip portion extending from an end of said body portion, wherein said tip portion has a polygonal cross section, and
       a centrally located melt bore extending through at least a portion of said body and tip portions.

18. An injection molding nozzle comprising:
    a nozzle tip, said nozzle tip having
       a body portion including at least one planar outer surface area,
       a tip portion extending from an end of said body portion, wherein said tip portion includes at least one planar outer surface area, and
       a centrally located melt bore extending through at least a portion of said body and.

19. The injection molding nozzle of claim 18, wherein said body potion includes a plurality of planar surface areas.

* * * * *

UNITED STATES PATENT AND TRADEMARK OFFICE
CERTIFICATE OF CORRECTION

| | |
|---|---|
| PATENT NO. | : 7,238,019 B2 |
| APPLICATION NO. | : 10/810679 |
| DATED | : July 3, 2007 |
| INVENTOR(S) | : Terry Schwenk |

It is certified that error appears in the above-identified patent and that said Letters Patent is hereby corrected as shown below:

In column 6, claim 15, line 39, replace "meld" before "bore" with -- melt --.

In column 6, claim 15, line 40, replace "meld" before "bore" with -- melt --.

In column 6, claim 18, line 60, after "and" add -- tip portions --.

Signed and Sealed this

Twenty-first Day of August, 2007

JON W. DUDAS
*Director of the United States Patent and Trademark Office*